United States Patent Office 3,679,371
Patented July 25, 1972

3,679,371
CRYSTALLIZATION AND RECOVERY OF ELEMENTAL SULFUR FROM SOLVENTS
Lawrence C. Tisdel and Harry B. Scott, Golden, Colo., assignors to Brameda Resources Limited, Vancouver, British Columbia, Canada
Filed June 27, 1969, Ser. No. 837,113
Int. Cl. B01d 9/02; C01b 17/08
U.S. Cl. 23—295
7 Claims

ABSTRACT OF THE DISCLOSURE

The process for the recovery of sulfur of controlled crystalline size from a solvent containing sulfur dissolved therein by a direct heat exchange relationship with a liquid, which is immiscible with said solvent. An immiscible liquid at a temperature different from that of the sulfur laden solvent is admixed directly therewith, mixed to insure adequate heat exchange contact, allowed to layer and drawn off for recycle. A slurry of crystalline sulfur in the phase in which it is contained, is withdrawn, separated and recovered.

BACKGROUND OF THE INVENTION

The supplies of sulfur obtainable from the well known Frasch sulfur mining process are rapidly dwindling. In terms of the world's increased demand for sulfur, the remaining known deposits of elemental sulfur are not amendable to the Frasch technique but, rather, are ideally situated for sulfur recovery by solvent extraction techniques.

These measured deposits occur throughout the world and major orebodies have been proven in the Philippines, Costa Rica, Bolivia, Guatemala, the United States, Canada and eleswhere.

These major sulfur-bearing orebodies, not amenable to Frasch mining techniques, are usually either volcanic in origin and/or deposited at or near the earth's surface. Normally they are too shallow in depth or their matrix is too fractured or too weak to permit the Frasch technique to be used economically. However, with the supply of sulfur being at its present level and with the demand increasing daily, these huge deposits become of increasing importance. Therefore, a great deal of attention has recently been given to processes for the recovery of their sulfur content. Among the operable processes for the recovery of elemental sulfur from these non-Frasch deposits are flotation concentration, hot water pressure autoclaving, thermal distillation, and solvent extraction techniques. It is with the latter process that the instant invention is concerned.

The process and apparatus of the present invention relates directly toward a solvent extraction technique for the recovery of elemental sulfur as a crystalline product from either a sulfur flotation process concentrate or from the raw elemental sulfur bearing ore deposit as mined.

The solvent extraction recovery technique involves the steps of slurrying a finely divided elemental sulfur containing material with a solvent for the sulfur. Contacting intimately the sulfur containing material with the solvent either by means of trickling contactors or efficient agitation or other means known to the art. This contact is maintained for a period of time sufficient to completely solubilize the elemental sulfur in the sulfur solvent.

In the solvent extraction process it is common practice to bring about the contact between the sulfur bearing material and the solvent at an elevated temperature, since elemental sulfur is ordinarily soluble to a greater degree in hot solvent than it is in cold solvent or in solvent at ambient temperatures or below. Thus when the relatively hot sulfur pregnant solvent—that is solvent which contains the maximum amount of sulfur dissolved therein— is clarified from undissolved matter and cooled or heated and evaporated, the sulfur crystallizes from the pregnant solution and can be recovered from the solvent so that an extremely pure sulfur product results. The recovered solvent, freed from dissolved sulfur, commonly referred to as the "lean" solvent, can then be recovered and recycled to the process.

THE INVENTION DESCRIBED

It is an object of the present invention to provide a process, and apparatus therefore, for the recovery of elemental sulfur from sulfur bearing materials in a crystalline form wherein crystals are of a controlled size.

It is a further object of this invention to present a process for the recovery of sulfur as a crystalline product either from a sulfur flotation process or from a raw elemental sulfur bearing ore.

A further object of the invention is to provide a process and apparatus for the recovery of crystalline sulfur from a hot sulfur pregnant solvent wherein the crystalline sulfur does not come in contact with a solid heat exchange surface and thereby avoids impairment of heat exchange efficiency resulting from scaling of such solid surfaces.

Another object of the invention is to provide a process and apparatus therefor wherein a sulfur crystal of desired size may be obtained by controlling the temperature differential between the hot sulfur pregnant solvent and the heat-exchanging material, by controlling the rate of temperature change of the pregnant solvent, and by controlling the temperature gradient of the pregnant solvent as it flows through the system.

A still further object of the invention is to provide a process and apparatus which eliminates over nucleation and resulting production of undesirable small sulfur crystals and the resulting crystallization agglomeration formation.

A still further object of the invention is to provide a process and apparatus therefor which results in a recovered sulfur product from a slurry of crystalline sulfur and solvent which is free flowing and does not tend to plug pipes or valves as is usual in prior art techniques.

These and further objects will become apparent to those skilled in the art as the description of the invention proceeds.

It has now been discovered, and forms the basis of the inventive concept, that a heat-exchange liquid can be injected directly into a body of sulfur pregnant solvent in a dispersed phase without detrimental effect to the sulfur, without loss of solvent and without loss of sulfur. It has been discovered that by taking advantage of the nature of sulfur, crystalline sulfur can be formed and can be maintained completely within the body of a separate phase without loss of sulfur to the other phase during the period of contact between the solvent and the heat exchange liquid.

It will be obvious to those skilled in the art that the present system offers tremendous advantage in comparison with prior art techniques. The heat transfer between the heat-exchange liquid and the solvent is at an absolute maximum since the total surface area of the individual droplets of heat-exchange liquid comprise the heat transfer surface. It is thus impossible to have any solid surface on which sulfur scale or deposit can build up in the instant process. It is also impossible in the present system to experience the usual difficulty with sulfur plugging since the crystalline sulfur formed by the present inventive process is completely free flowing.

As is well known in the art, and as will be appreciated by those familiar therewith, there are a number of known solvents which may be utilized in the solvent extraction process described generally above. Operable solvents include carbon bisulfide, kerosene, benzene, toluene, xylene, dimethyldisulfide, perchlooroethylene, trichloroethylene, other chlorinated hydrocarbons and other hydrocarbon materials. These solvents, either alone or in combination, have individual advantages and disadvantages for use in solvent extraction techniques. Some of them (trichloroethylene, for example) are nonflammable and not explosive; others are flammable and explosive, particularly when their vapors are mixed with oxygen; some of them will dissolve a relatively large amount of sulfur per unit volume, such as carbon bisulfide, others will dissolve lesser amounts of sulfur; some of them are reactive with sulfur or susceptible to chemical degradation, etc.

However, common among the various considerations affecting the choice of a particular solvent or combination of solvents for use in solvent extraction processes for the recovery of sulfur is the method used for recovery of the dissolved sulfur from the sulfur pregnant solvent. Many different sulfur recovery techniques have been explored. In some cases simple cooling of the sulfur pregnant solvent in conventional heat exchangers has been utilized. In other cases the hot sulfur pregnant solvent has been passed through conventional crystallizers. In other cases the pregnant solution has been agitated in a jacketed vessel with a coolant in the jacket of the vessel or passed through tubes or coils in order to effect the desired temperature decrease.

Those skilled in the art will appreciate that the separation procedures involve one common factor; a heat exchange system in which the transfer of heat between the hot sulfur pregnant solvent and a heat-exchange medium is accomplished by means of devices which prevent the heat-exchange material from contacting the sulfur. The present invention departs from these prior art techniques in that the heat transfer is brought about by direct contact between the heat-exchange liquid and the sulfur pregnant solvent. Crystalline sulfur forms as a result of this heat exchange process, and is recovered from the phase in which it is contained after crystallization. With the instant process, perfect countercurrent flow of solvent and heat-exchange liquid is obtained because of the difference in densities between the solvent and the heat-exchange liquid. This countercurrent flow affords the ultimate in control of sulfur crystallization rate and concomitant growth of sulfur crystals. The process of this invention similarly permits both the heat-exchange liquid and solvent phases during the heat transfer relationship to be in literal physical hydraulic equilibrium and thus the suspended crystalline sulfur can flow by virtue of its high specific gravity into a process outlet means at a uniform rate.

It should also be pointed out that the practice of the instant invention may be carried out using solvents for sulfur which are either more dense or less dense than the immiscible heat-exchange liquid used. If the solvent is more dense than the heat-exchange liquid, the heat-exchange liquid would then be injected below the entrance point of the solvent into the crystallizer apparatus, so that as the more dense solvent works downward and the heat-exchange liquid works upward through the solvent. Such a countercurrent heat transfer technique would prevail with a sulfur solvent such as trichloroethylene and a heat-exchange liquid such as water. On the other hand, if the solvent was, for example, kerosene, the heat-exchange liquid such as water would be injected above the point of entrance of the sulfur pregnant kerosene into the crystallizer apparatus and the heat-exchange liquid would move downwardly through the ascending sulfur pregnant kerosene. In a situation where the solvent is more desnse than the heat-exchange liquid, the crystalline sulfur resulting from the heat transfer relationship would remain in slurry form in the effluent solvent; in the case where the solvent is less dense than the heat-exchange liquid, the crystalline sulfur obtained would remain in slurry with the heat-exchange liquid and would be removed from the crystallizing zone in the form of a slurry with the heat-exchange liquid.

It will also be appreciated by those skilled in the art that the relative boiling point of the heat-exchange liquid and the sulfur solvent are not critical. The instant invention process can be practiced at temperatures either below or above the boiling point of either immiscible coolant liquid or the solvent.

In the case of an operation carried out below the boiling point of the heat-exchange liquid and the sulfur solvent, heat-exchange liquid and solvent would flow from the crystallizing zone as liquids and the crystalline sulfur would flow as a slurry with the heavier liquid. In the case of an operation at temperatures above the boiling point of the solvent but below the boiling point of the heat-exchange liquid, the heat-exchange liquid would flow from the crystallization zone as a liquid, most of the solvent would be removed in vapor form, and the crystalline sulfur would form as a result of the decreased concentration of the sulfur solvent and would flow from the crystallizer in the heavier liquid phase. In the case of operation at temperatures above the boiling point of both the heat-exchange liquid and the sulfur solvent, most of the heat-exchange liquid and most of the solvent would be removed from the crystallizing zone as vapors and the crystalline sulfur would be removed from the crystallizing zone with the residual phase of the heavier liquid.

With respect to pressure, the instant process can be carried out at pressures above, below or at that of the atmosphere. For example, the entire system could quite practically be contained under pressure. Control of the pressure would then be obtained by permitting some of the heat-exchange liquid and/or the solvent to discharge as vapor.

In those cases wherein the solvent for the sulfur has an appreciable solubility in the coolant liquid, the heat-exchange liquid, saturated with the solvent and flowing from the crystallizer zone, is simply recycled through a conventional heat exchange system for cooling or heating and thence back into the crystallizer zone. This recycling prevents any physical loss of solvent and still affords the direct heat transfer relationship.

Since the instant process involves a "closed-loop recycle system" for heat-exchange liquid the addition of additives such as inorganic salts, basic materials, surface active agents, anti-foaming agents, and the like, to the heat-exchange liquid is readily allowable. Controlling the density of the heat-exchange liquid, controlling the acidity or corrosive nature of the sulfur solvent, improvements in crystallization characteristics of the sulfur, and other advantages for the use of additive materials will be clear to those skilled in the art.

One major advantage of this improved process is to be found in the degree of process control which is possible by virtue of the balanced hydraulic system and of the direct heat transfer relationship which is obtained by the physical contact of the heat-exchange liquid and the sulfur pregnant solvent. By the use of multistage injections of the coolant liquid into hot sulfur pregnant solvent and the exact temperature control which is then obtainable, temperature differential between the incoming solvent and the incoming heat exchange liquid may be controlled within extremely narrow limits as desired. It has been found that crystal size of the crystalline sulfur obtained is a direct function of the temperature differential between the sulfur-pregnant solvent and the heat-exchange liquid. As this temperature differential becomes smaller and smaller, crystalline particle size becomes larger. It is believed that this is explained by the fact that with a lower temperature differential ($\Delta T$), the degree of nucleation is reduced so that as supersaturation is relieved the sulfur coming out of the solvent deposits upon crystals that have already begun to form rather than forming separate smaller crystals. It is, of course, of benefit in any process of this type to obtain sulfur crystals of a maximum size. Thus it is preferable in the instant process to control the ΔT to the minimum value. For example, using water as the heat-exchange liquid and trichloroethylene as the solvent, a ΔT of from 1 to 2° F. has been found to give a crystalline size which is optimum.

It is also desirable, of course, to obtain the highest possible crystallization rate in any commercial process. The rate of crystallization of sulfur from a sulfur pregnant solvent has been found to be, in the instant process, a direct function of the rate of cooling or heating of the solvent by the heat-exchange liquid. The rate of cooling or heating of the solvent will, of course, vary directly with the ΔT. That is to say, the temperature of the sulfur bearing solvent will change at a slower rate when ΔT is small than when ΔT is large. Therefore, it is essential that the relationship between ΔT and the rate of temperature change be carefully controlled to obtain the optimum crystallization process performance.

The invention will be more clearly explained by referring to the following drawings in which.

Figure 1:
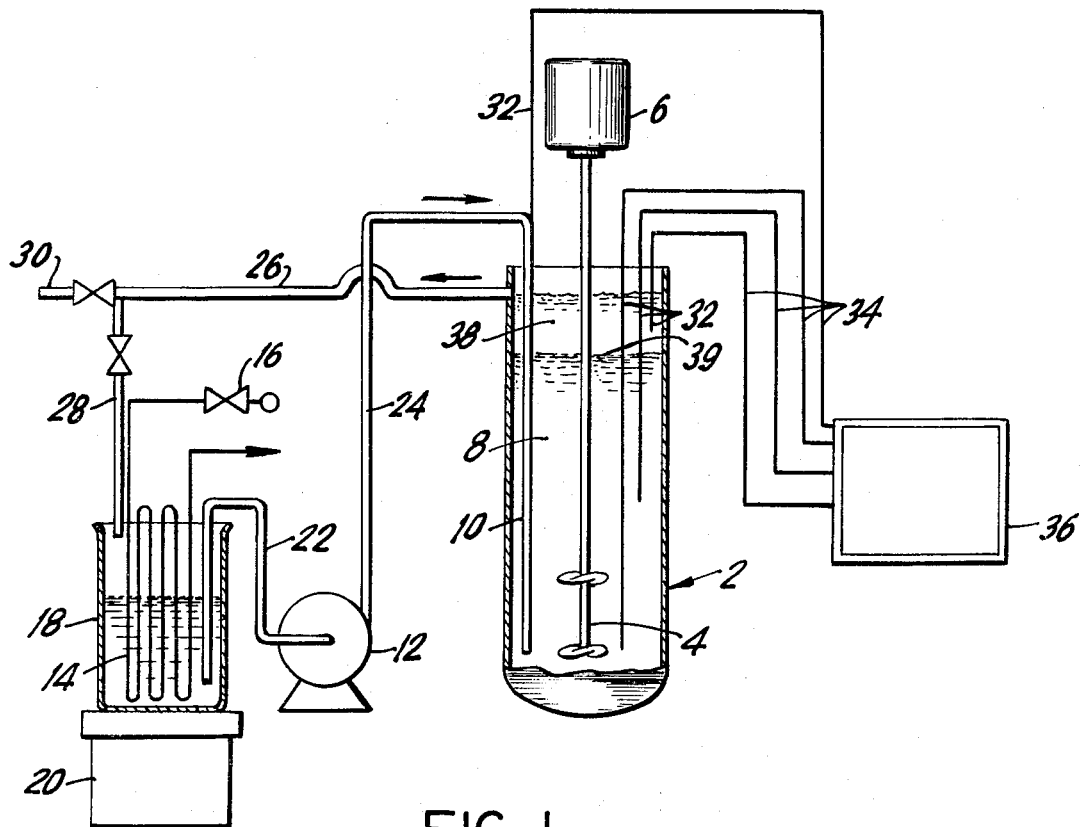
FIG. 1 illustrates a laboratory batch apparatus.

Turning now to the drawing of FIG. 1, reference numeral 2 indicates a crystallizing vessel which is equipped with agitating device 4, driven by motor 6. This vessel 2 represents a crystallizing zone and is charged with the desired amount of a solvent containing dissolved sulfur therein as represented by numeral 8. An immiscible heat-exchange liquid having a temperature below that of the solvent is introduced into crystallizer 2 by means of inlet pipe 10, line 24 and recycling pump 12. The temperature of the heat-exchange liquid is controlled as desired by means of heat-transfer coils 14, through which a cooling medium is circulated by means of valve 16 and a cooling and circulating system, not shown. A heat-exchange liquid reservoir indicated at 18 is also equipped with a heating device 20, in order to increase the temperature of the liquid if required.

The desired flow of the heat-exchange liquid is then circulated by means of pipe 22, circulating pump 12 through line 24 and line 10 into crystallizer vessel 2. A heat-exchange liquid overflow pipe shown at 26 is provided to withdraw heat-exchange liquid and for recirculating to reservoir 18 through valved line 28. Makeup heat-exchange liquid may be added to the system through valved line 30.

The crystallizer zone is provided with thermowells 32 connected to thermocouples 34 and a multipoint temperature recorder shown at 36. The thermowells are provided at locations which allow for recording the various temperatures necessary for process control and, as shown in FIG. 1, measure and record the temperature at the bottom of the crystallizer zone, at the middle of the solvent phase, the middle of the heat-exchange liquid phase and at the point of introduction of the heat-exchange liquid into the crystallizer zone.

In operation, crystallizer vessel 2 is charged with the sulfur pregnant solvent, an immiscible heat-exchange liquid is injected into direct contact therewith by means of circulating pump 12, lines 24 and 10, impeller 44 is activated by means of impeller motor 6 and the direct intimate contact between the sulfur pregnant solvent and the heat-transfer liquid takes place.

As illustrated in FIG. 1, an immiscible heat-transfer liquid which is less dense than the sulfur solvent is introduced into the bottom of the crystallizer zone, is thoroughly admixed with the sulfur solvent by means of impeller 4, moves upwardly through the solvent phase as a dispersed phase and separates therefrom as a separate coolant liquid phase, as shown at 38. The interface between the solvent and liquid phases is shown at 39.

The separated heat-exchange liquid phase is continuously withdrawn through lines 26 and 28 into reservoir 18, is subjected to the requisite heating or cooling as may be necessary in reservoir 18 and is recirculated to the crystallization zone through line 22, circulating pump 12, line 24 and line 10.

When the desired separation of crystalline sulfur from the sulfur pregnant solvent has been obtained in crystallizer vessel 2, the process is stopped and the crystalline sulfur is recovered from the slurry in crystallizer vessel 2. The practice of the instant invention is described by referring to the following examples in which the laboratory batch apparatus of FIG. 1 is used.

EXAMPLE I

This typical experiment was designed to study sulfur crystalline size growth under conditions of the carefully controlled and uniform heat transfer rendered possible by this invention. 2,500 g. of trichloroethylene having a boiling point of 179° F. at 620 mm. Hg were saturated at 150° F. with 144.5 g. elemental sulfur analyzing 99.982% sulfur. This system was then placed in an experimented glass apparatus arranged as per FIG. 1. Water varying in temperature over the period of operation from 150° F. was then introduced into the bottom of the hot sulfur prgenant trichloroethylene as a dispersed phase during continuous agitation at a rate of 72 g./min. to result in a solvent cooling rate of 0.73° F. per minute. During the period of operation, a temperature difference ($\Delta T^1$) of 10 to 13° F. was maintained between inflowing dispersed heat-exchange water at the point of inflow and the solvent, while a temperature differential $\Delta T^2$ of 1 to 3° F. was measured between solvent layer and coalesced heat-exchange water layer. The average of $\Delta T^1$ and $\Delta T^2$ is calculated and represents $\Delta T^{avg.}$, and, as explained above, along with solvent cooling rate correlates directly with crystalline particle size.

At the end of the operation, the inflowing heat-exchange water temperature was 60° F., the solvent-sulfur crystal slurry temperature was 70° F., and the supernatant heat-exchange water layer temperature was 73° F. A total of 109.9 g. of sulfur crystals were recovered from the apparatus and 34.6 g. of sulfur remained dissolved in the residual solvent. The crystals had the following screen analysis.

|  | Weight percent | |
|---|---|---|
|  | Direct | Cumulative |
| Tyler mesh: | | |
| +10 | 0.0 | 0.0 |
| +28 | 25.1 | 25.1 |
| +35 | 36.3 | 61.4 |
| +48 | 24.2 | 85.6 |
| +65 | 9.8 | 95.4 |
| +100 | 4.1 | 99.4 |
| −100 | 0.6 | 100.0 |

NOTE.—With a solvent cooling rate of 0.73° F. per minute and with a Δ $T^{avg.}$ of 7° F., 85.6% of the crystalline sulfur was retained on the +48 mesh screen.

EXAMPLE II

This typical series of experiments using the apparatus of FIG. 1 and the procedures described in Example I were designed to sutdy control of crystalline size growth through control of crystallizer temperature differentials and control of solvent cooling rate.

| Experiment | A | B | C |
|---|---|---|---|
| Operating conditions: | | | |
| 1. Charge to crystallizer: | | | |
|    Trichloroethylene, gm | 2500.0 | 2500.0 | 2500.0 |
|    Sulfur, gm | 144.5 | 144.5 | 144.5 |
| 2. Heat-exchange liquid flow rate, ml./min. | 15 | 70 | 368 |
| 3. $\Delta T^1$, inflowing heat-exchange liquid vs. solvent, °F | 42 | 1 | 3 |
| 4. $\Delta T^2$, solvent layer vs. coalesced heat-exchange liquid layer, °F | 4 | 2 | 1 |
| 5. $\Delta T^{avg.}$, average of $T^1$ and $T^2$, °F | 23 | 6 | 2 |
| 6. Solvent cooling rate, °F./min | 0.44 | 0.83 | 1.80 |
| 7. Sulfur balance at end of run recovered | | | |
| 7. Sulfur balance at end of run: | | | |
|    Recoverd crystalline sulfur, gm | 104.3 | 109.9 | 106.9 |
|    Dissolved sulfur in residual solvent, gm | 40.2 | 35.4 | 37.6 |
| 8. Screen analysis of crystalline sulfur | | | |

See the following table:

| | Cumulative, weight percent | | |
|---|---|---|---|
| Tyler mesh: | | | |
| +10 | 0.0 | 0.0 | 0.0 |
| +28 | 0.3 | 13.6 | 4.3 |
| +35 | 8.7 | 60.8 | 30.3 |
| +48 | 37.8 | 82.1 | 73.4 |
| +65 | 88.3 | 95.1 | 93.8 |
| +100 | 96.3 | 99.4 | 98.9 |
| −100 | 100.0 | 100.0 | 100.0 |

Of the three experiments of this typical series, the operating conditions of experiment "B," in which $\Delta T^{avg.}$ was controlled at 6° F. and solvent cooling rate was controlled at 0.83° F./min., resulted in a superior sulfur crystal size distribution.

From many similar experiments of which the foregoing examples are typical, it is readily apparent that the novel crystallization system of this invention for recovery of sulfur from a sulfur pregnant solvent is extremely simple and highly efficient.

Figure 3:
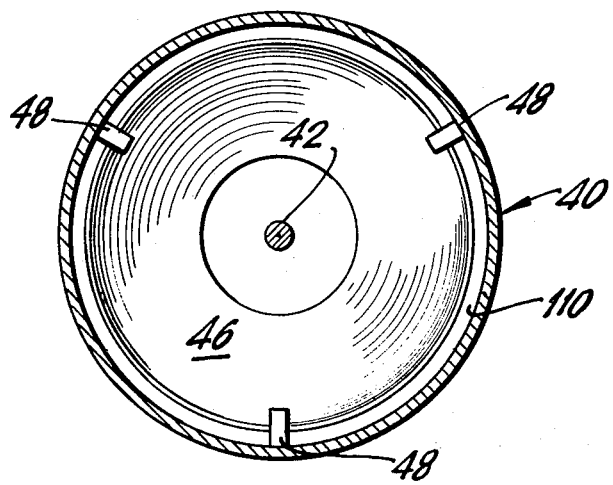
FIG. 3 is a view in cross section of FIG. 2 taken along the line X—X of FIG. 2.
Figure 2:
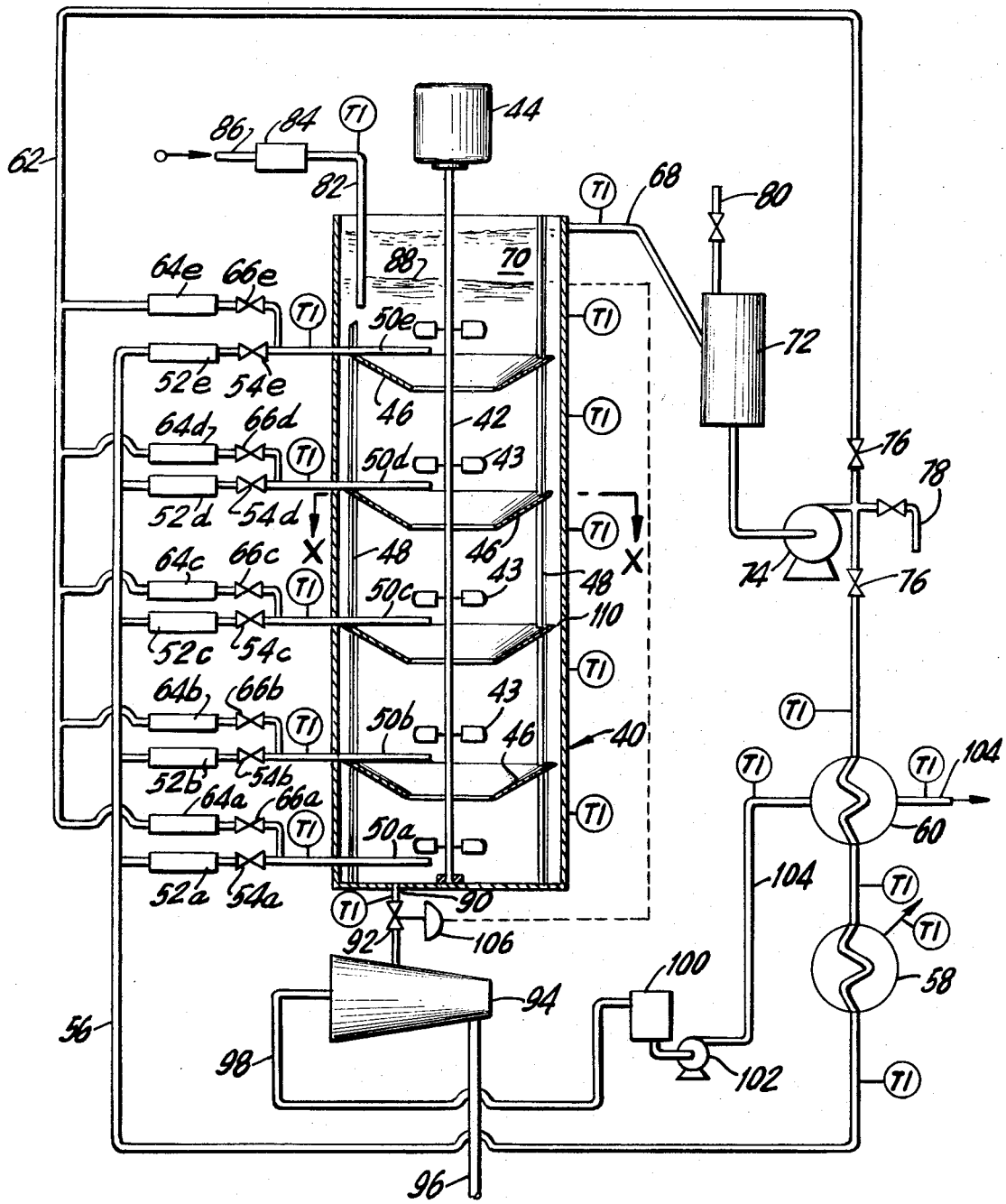
FIG. 2 is a detailed drawing of a crystallizer unit suitable for commercial operation.

Turning now to FIGS. 2 and 3, there is described an apparatus for the practice of the inventive process in a continuous manner in which heat is removed from the solvent to effect crystallization of solvent.

In these drawings reference numeral 40 indicates a vessel with comprises the crystallization zone of this invention. Vessel 40 is equipped with agitating means illustrated herein by an impeller shaft 42, agitators 43 and motor drive 44.

Crystallizer vessel 40 is equipped with a plurality of inclined ring baffles shown in cross section at 46 which are supported within the crystallizer vessel by a plurality of vertical side baffles illustrated at 48.

Crystallizer vessel 40 is provided with a plurality of heat-exchange liquid inlet dispersing pipes shown in the drawing as 50a–e. Heat-exchange liquid is injected into the crystallizer zone through the inlet dispersion pipes through flowmeters 52a–e and flow control valves 54a–e, the heat-exchange liquid being distributed by manifold line 56 after having passed through heat exchangers 58 and 60.

A system for the careful control of the temperature of the heat-exchange liquid being introduced in the crystallizer vessel is accomplished by provisions for the introduction of the heat-exchange liquid at a different temperature, such as, for example, a warmer temperature, by means of manifold line 62, flowmeters 64a–e and flow control valves 66a–e.

An upper phase liquid overflow pipe is provided as shown at 68 to continuously remove overflow of the upper phase 70 into a surge tank 72. From surge tank 72 the upper phase is recycled to the system by means of circulating pump 74, valves 76 and lines 56 or 62. A sampling line or a bleed valve is provided in line 62 as shown at 78. Makeup heat-exchange liquid may be added to surge tank 72 through line 80.

Heat is recovered by exchange between the two phase in heat exchanger 60. Heat is further removed as required from the recycle heat-exchange liquid by exchange with a medium external to the process in heat exchanger 58.

The crystallizer vessel 40 is provided with an inlet line 82, flowmeter 84 and line 86 for the addition of the more dense phase of the crystallizer system, for example, the sulfur-pregnant solvent, which is normally added to the crystallizer vessel beneath the interface 88 of the two-phase system within the crystallization zone.

The more dense phase of the two-phase system and the sulfur crystals are withdrawn from the bottom of the crystallization zone through outlet line 90, control valve 92 and piped into separation device 94.

Separation device 94 is preferably a centrifuge and is used to separate, in the normal operation of the process, crystalline sulfur from the phase in which it is contained. The separated crystalline sulfur is removed from the separation device 94 through line 96. The separated recovered phase is removed from the separation vessel through line 98, passed through surge tank 100, through pump 102, line 104 and through heat exchanger 60. After passing through heat exchanger 60 the recovered material is delivered by means of line 104 to storage or recycled to the process at an earlier stage thereof.

The apparatus is provided with various temperature indicators illustrated in the drawing as TI and with various other flowmeters and flow control valves which are not shown.

Flow control valve 92 operates by means of liquid level controller 106 which is connected to an interface sensor at interface level 88 in order to carefully control the rate of bottom draw off.

In operation, using, as an example, a heat-exchange liquid of less density than the solvent, in this case trichloroethylene as the sulfur solvent and water as the heat-exchange liquid, the sulfur-pregnant trichloroethylene is continuously added to the crystallizer vessel 40 by means of line 86, flow-meter 84 and line 82. Water at a temperature below that of the sulfur-pregnant solvent is circulated through the crystallizing vessel as a dispersed phase by means of flowmeters 52a–e, flow control valves 54a–e and inlet pipes 50a–e. Intimate contact between the sulfur pregnant solvent and the water is assured by the agitation provided by agitators 43.

The dispersed phase, that is the water phase, moves gradually upward, because of its lesser density, through the body of the sulfur pregnant solvent in the crystallization zone, and cools the sulfur pregnant solvent. The water after coalescing into layer 70 is removed continuously by overflow through line 68, into surge tank 72 and is recirculated to the system by pump 74. The water discharging from pump 74 is split into two flows by means of lines 62 and 56. Line 62 carries warm heat-exchange water to inlet pipes 50a–e for blending with cold heat-exchange water to provide temperature control within crystallization zone 40. Line 56 carries water through heat exchanger 60 where it is cooled by exchange with cold barren solvent issuing from pump 102 and thereby effecting heat recovery by heating the barren solvent, through heat exchanger 58 where the temperature of the coolant water is further reduced by heat exchange with a cooling medium external to the process, and finally through flow meters 52a–e, control valves 54a–e, and inlet pipes 50a–e into crystallization zone 40. In the crystallization zone 40 the process of cooling the sulfur-pregnant solvent with the dispersed water is repeated.

The slurry of barren solvent and crystalline sulfur obtained as a result of the heat exchange relationship occurring in the crystallizing zone of crystallizer vessel 40 is continuously removed from the bottom of the crystallizer zone through line 90 and control valve 92. This slurry passes into separator 94 where the solid crystals are separated from the solvent liquid and removed through line 96 from the process. The recovered lean solvent is recirculated through line 98, surge vessel 100, circulating pumps 102, and line 104 and heat exchanger 60 to an earlier stage of the process.

Figure 4:
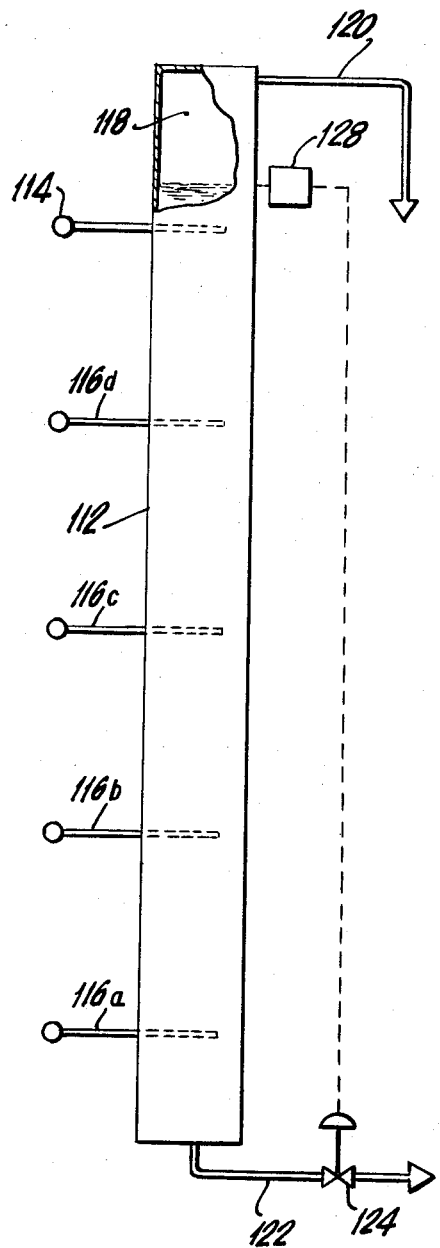
FIG. 4 is a drawing of an alternate crystallization zone for the crystallizer unit of FIG. 2.

Turning now to FIG. 4, there is described an alternate type of crystallization zone which may be used in the practice of the inventive process. This zone is also used in a continuous manner. In this drawing reference number 112 indicates a column-type vessel which comprises this alternate crystallization zone. In operation, using as an example, trichloroethylene as the sulfur solvent and water as the heat-exchange liquid, the sulfur-pregnant trichloroethylene is continuously introduced into the crystallization zone 112 by means of line 114. Water at a temperature below that of the sulfur-pregnant solvent is introduced into the crystallization zone as a dispersed phase by means of inlet pipes 116a–d. The sulfur-pregnant solvent flows downward and the dispersed coolant water flows upward by virture of the difference in densities. The coolant-water after coalescing into layer 118 is removed continuously by overflow through line 120. The slurry of crystalline sulfur and trichloroethylene formed by virtue of the direct-contact cooling with the dispersed water is removed continuously from the crystallization zone through line 122 at a controlled rate equal to that of the incoming pregnant-solvent by means of interface level-control valve 124 connected to interface sensor-controller 128.

The instant invention is further illustrated by the following specific example of results obtained with particular operating conditions using a crystallizer unit similar to that shown in FIG. 2 and FIG. 3. It will, of course, be understood that the following description is given primarily for purposes of illustration and is not to be construed in any way to limit the invention in its broader aspects.

EXAMPLE III

The typical practice of the instant invention using apparatus similar to that shown in FIG. 2 and FIG. 3 having a vessel volume of approximately 370 gallons is described herein.

Over a period of 78 hours, 203,000 lbs. of sulfur-pregnant trichloroethylene at a temperature of 159° F. was fed to the crystallizer unit. During the period of operation, 4,343 lbs. of crystalline sulfur were produced. The typical screen analysis of this product after being processed through a centrifuge and a solvent evaporator was:

| Tyler mesh: | Cumulative wt. percent |
|---|---|
| +10 | 5.7 |
| +28 | 9.1 |
| +35 | 25.8 |
| +48 | 53.2 |
| +65 | 77.5 |
| +100 | 92.0 |
| −100 | 100.0 |

The typical purity of this product was 99.98 wt. percent elemental sulfur.

Average operating conditions during the period of operation were:

| | |
|---|---|
| Pregnant solvent feed rate, lb./hr. | 2,600 |
| Pregnant solvent temperature, ° F. | 159 |
| Heat-exchange liquid flow rates, lb./hr.: | |
| Inlet pipe 50a | 600 |
| Inlet pipe 50b | 500 |
| Inlet pipe 50c | 200 |
| Inlet pipe 50d | 150 |
| Inlet pipe 50e | 0 |
| Heat-exchange liquid inlet temperatures, ° F.: | |
| Inlet pipe 50a | 50 |
| Inlet pipe 50b | 65 |
| Inlet pipe 50c | 85 |
| Inlet pipe 50d | 89 |
| Inlet pipe 50e | ---- |
| Crystallizer volume temperature gradient, top to bottom, ° F.: | |
| Coalesced water layer | 95 |
| Top stage-compartment | 92 |
| Next stage-compartment | 87 |
| Next stage-compartment | 78 |
| Bottom stage-compartment | 75 |
| Crystalline sulfur production rate, lb./hr. | 56 |

It is thus clearly evident that the process and apparatus of this invention provides for the recovery of a crystalline sulfur of controlled size, efficiently and economically, without the inherent disadvantages of the prior art processes. The desired results are obtained by controlling the temperature differential between the sulfur pregnant solvent and the heat-exchange liquid, which by the inventive process is conveniently and accurately accomplished By means of the process and apparatus just described, the sulfur crystal particle size may be varied as desired, and the resulting slurry of substantially sulfur free solvent and crystalline sulfur can be efficiently separated by any of any of the well known separation techniques. The heat-exchange liquid, illustrated for example above by water, is continuously recycled to the crystallization process and is easily and efficiently controlled as to its temperature by means of the apparatus illustrated. An additional advantage of the process is the utilization of waste heat by means of the heat-exchanger circuits so that the heat which would otherwise be lost is added to the barren solvent as it issues from the crystallization process.

To summarize briefly, the instant invention relates to a process for the recovery of elemental sulfur from a solvent containing sulfur dissolved therein which comprises the utilization of a novel heat transfer technique wherein a liquid of a sensity different from that of the solvent for the sulfur and at a temperature different from that of said solvent is admixed in intimate contact therewith, causing the temperature of the sulfur containing solvent to change and/or causing said solvent to vaporize and thereby causing the solubilized sulfur to crystallize therefrom in a controlled crystal size.

What is claimed is:

1. A process for the recovery of sulfur of a controlled crystalline size from a solvent containing sulfur dissolved therein comprising the steps of:

introducing a sulfur-laden solvent at a level at the upper portion of a vertical crystallization zone;

injecting an immiscible aqueous heat exchange liquid into said vertical crystallization zone at a plurality of levels spaced vertically of one another and located downwardly of the level of introduction of said sulfur-laden solvent to disperse the aqueous heat exchange liquid into the sulfur-laden solvent, said aqueous liquid being lower in density than said sulfur-laden solvent such that a counter-current flow is established between the down flowing heavy solvent and the rising lighter aqueous liquid;

the spacing between said levels being sufficient to insure adequate direct heat exchange between the solvent and the aqueous liquid to cause formation of crystalline sulfur by virtue of the heat exchange contact between solvent and aqueous liquid;

allowing the solvent and aqueous liquid to separate in said vertical crystallization zone to form an interface in said zone, the area above said interface containing coalesced aqueous liquid and the area below said interface containing a dispersion of said heat exchange liquid in said sulfur-laden solvent;

withdrawing coalesced aqueous liquid from the top portion of said crystallization zone and withdrawing a slurry of crystalline sulfur and solvent from the bottom portion of said crystallization zone to maintain said interface within said crystallization zone at a point above the level of introduction of said sulfur-laden liquid;

maintaining the temperature of the aqueous liquid introduced into said crystallizing zone cooler than the temperature of the sulfur-laden solvent into which it is introduced and cooler than the temperature of the aqueous liquid introduced at the next higher level whereby the sulfur, on moving downwardly through the crystallizing zone, moves into a cooler environment.

and separating crystalline sulfur from the solvent slurry removed from the bottom portion of said crystallization zone.

2. A process according to claim 1 wherein said heat exchange liquid comprises an inorganic salt solution.

3. A process according to claim 1 wherein said heat exchange liquid comprises a member selected from the group consisting of inorganic bases and basic salt solutions, the basicity thereof being controlled so as to result in the neutralization of acidity present in said sulfur-laden solvent.

4. A method according to claim 1 wherein said solvent comprises a chlorinated hydrocarbon.

5. A method according to claim 1 wherein said solvent is selected from the group consisting of trichloroethylene, perchloroethylene and trichloropropane.

6. A continuous process according to claim 1 wherein the injection of heat exchange liquid is controlled to obtain a controlled temperature gradient through the said crystallization zone.

7. A continuous process according to claim 6 wherein the injection of heat exchange liquid and the resulting temperature gradient are controlled to result in a controlled growth of the crystalline sulfur.

References Cited

UNITED STATES PATENTS

| | | | |
|---|---|---|---|
| 2,088,190 | 7/1937 | Du Pont | 23—312 S |
| 2,785,059 | 3/1957 | McDonald | 23—312 S |
| 2,934,414 | 4/1960 | Bradley | 23—312 S |
| 3,337,307 | 8/1967 | Kuster | 23—312 S |
| 3,535,089 | 10/1970 | Lewis | 23—312 S |

FOREIGN PATENTS

| | | | |
|---|---|---|---|
| 108,595 | 1/1959 | Pakistan | 23—312 S |
| 449,911 | 7/1936 | Great Britain | 23—312 S |
| 690,839 | 4/1953 | Great Britain | 23—312 S |
| 1,147,566 | 4/1963 | Germany | 23—312 S |

NORMAN YUDKOFF, Primary Examiner

S. J. EMERY, Assistant Examiner

U.S. Cl. X.R.

23—300, 312 S, 308 S